United States Patent
Vicente Oliveros

(10) Patent No.: US 10,259,587 B2
(45) Date of Patent: Apr. 16, 2019

(54) AIRCRAFT COMPRISING A HEAT EXCHANGER

(71) Applicant: AIRBUS OPERATIONS S.L., Getafe (ES)

(72) Inventor: David Vicente Oliveros, Getafe (ES)

(73) Assignee: Airbus Operations S.L., Getafe (ES)

( * ) Notice: Subject to any disclaimer, the term of this patent is extended or adjusted under 35 U.S.C. 154(b) by 503 days.

(21) Appl. No.: 15/070,656

(22) Filed: Mar. 15, 2016

(65) Prior Publication Data
US 2016/0272330 A1 Sep. 22, 2016

(30) Foreign Application Priority Data
Mar. 16, 2015 (EP) .................................... 15382117

(51) Int. Cl.
*B64D 13/06* (2006.01)
*F02C 6/08* (2006.01)

(52) U.S. Cl.
CPC ................ *B64D 13/06* (2013.01); *F02C 6/08* (2013.01); *B64D 2013/0618* (2013.01); *B64D 2013/0644* (2013.01); *B64D 2013/0648* (2013.01); *Y02T 50/56* (2013.01)

(58) Field of Classification Search
CPC ........... B64D 13/06; B64D 2013/0618; B64D 2013/0644; B64D 2013/0648; B64D 2013/064; B64D 2013/0603; F02C 6/08; Y02T 50/56
USPC ......................................................... 62/241
See application file for complete search history.

(56) References Cited

U.S. PATENT DOCUMENTS

| 4,392,350 | A | * | 7/1983 | Marks | ....................... | F01B 9/04 |
| | | | | | | 60/518 |
| 6,427,471 | B1 | | 8/2002 | Ando et al. | | |
| 2012/0096830 | A1 | * | 4/2012 | Manoharan | ............... | F01D 1/16 |
| | | | | | | 60/204 |
| 2013/0291651 | A1 | * | 11/2013 | Kelnhofer | .............. | B64D 13/06 |
| | | | | | | 73/861.351 |
| 2014/0260250 | A1 | * | 9/2014 | Oxner | ....................... | F01K 7/36 |
| | | | | | | 60/645 |
| 2015/0047684 | A1 | * | 2/2015 | Mitchell | ................. | H01L 35/28 |
| | | | | | | 136/201 |

* cited by examiner

*Primary Examiner* — Joseph F Trpisovsky
(74) *Attorney, Agent, or Firm* — Greer, Burns & Crain Ltd.

(57) ABSTRACT

An aircraft comprising a heat exchanging pack comprising an energy recovering module with a hot and a cold side, the hot side thermally contacting the cold side, providing a heat exchange. The heat exchanging pack also comprises a secondary heat exchanger and a compressor coupled with a turbine. The hot side module inlet fluidly communicates with the bleed air duct, the cold side module inlet fluidly communicates with the ram air duct, the hot side module outlet fluidly communicates with the compressor inlet, the compressor outlet fluidly communicates with the hot side secondary inlet, the hot side secondary outlet fluidly communicates with the turbine inlet, and the cold side secondary inlet fluidly communicates with the ram air duct. The energy recovering module comprises a conversion apparatus, configured to generate energy out from the heat exchange taking place in the energy recovering module between the hot and cold sides.

5 Claims, 4 Drawing Sheets

AIRCRAFT COMPRISING A HEAT EXCHANGER

CROSS-REFERENCES TO RELATED APPLICATIONS

This application claims the benefit of the European patent application No. 15382117.8 filed on Mar. 16, 2015, the entire disclosures of which are incorporated herein by way of reference.

BACKGROUND OF THE INVENTION

The present invention is related to the field of heat exchangers, especially the heat exchangers that are used in aircraft to control the temperature of the bleed air from the aircraft engine.

Aircraft comprise several systems which are intended to deal with air flows throughout the aircraft. Air is needed to feed some parts of the aircraft, such as air conditioning, and must therefore meet particular values of pressure and temperature.

Aircraft comprised in the state of the art deal with these requirements by providing heat exchanging packs, which usually comprise a pair of heat exchangers, a primary heat exchanger and a secondary heat exchanger, as seen, for example, in document U.S. Pat. No. 6,427,471 A1.

Hot, high pressure bleed air from an engine, an auxiliary power unit, or a ground source, is directed into the hot side of the primary heat exchanger. In turn, cold air (at ambient pressure and temperature) enters in the cold side of the secondary heat exchanger. Hot air is cooled and then enters a compressor. After that, it enters the hot side of the secondary heat exchanger, where it is cooled by the cold air that enters the cold side of said secondary heat exchanger. After that, it expands and cools in the turbine, which also moves the former compressor, and goes to the air conditioning facilities. Cold air that enters the cold side of the secondary heat exchanger, after cooling the air in the hot side of the secondary heat exchanger, enters the cold side of the primary heat exchanger and cools the hot side in the secondary heat exchanger. After that, heated cold air is exhausted to ambient. All these steps may be seen in the aforementioned document.

These heat exchanging packs are suitable for providing the air from the engine with the suitable properties that make it adequate for its use in the cabin or in other aircraft facilities. However more than 100 kW of energy is typically thrown away to atmosphere through the RAM air channel because of the air cooling in the primary heat exchanger. This efficiency is improved by this invention.

SUMMARY OF THE INVENTION

The present invention provides an improvement on efficiency for this scenario by an aircraft according to claim 1. All the features described in this specification, including the claims, description and drawings, can be combined in any combination, with the exception of combinations of such mutually exclusive features.

The invention provides an aircraft comprising
an engine with a bleed air port suitable for letting air from the engine flowing into a bleed air duct,
a ram air inlet flap, suitable for letting air from the outside of the aircraft flowing into a ram air duct,
a heat exchanging pack comprising an energy recovering module with a hot side comprising a hot side inlet and a hot side outlet, and a cold side, comprising a cold side inlet and a cold side outlet, the hot side being in thermal contact with the cold side via a conversion apparatus, thus causing a heat exchange,
a secondary heat exchanger with a hot side inlet, a hot side outlet, a cold side inlet and a cold side outlet, and
a compressor coupled with a turbine, the compressor and turbine having an inlet and an outlet,
such that
the hot side inlet of the energy recovering module is in fluid communication with the bleed air duct,
the cold side inlet of the energy recovering module is in fluid communication with the ram air duct,
the hot side outlet of the energy recovering module is in fluid communication with the compressor inlet,
the compressor outlet is in fluid communication with the hot side inlet of the secondary heat exchanger,
the hot side outlet of the secondary heat exchanger is in fluid communication with the turbine inlet,
the cold side inlet of the secondary heat exchanger is in fluid communication with the ram air duct,
wherein
the conversion apparatus is adapted to generate electrical energy out from the heat exchange that takes place in the energy recovering module between the hot side and the cold side.

This device allows obtaining energy out of the heat exchange that takes place in the energy recovering module, thus improving the energy efficiency of the heat exchanging pack. Instead of wasting heat, energy could be transformed into electrical power, thus providing an alternative power source which is suitable for being used in ETOPS instead of the APU. This advantage would allow doing without the additional fuel needed for addressing the one-engine-inoperative scenario.

In a particular embodiment, the conversion apparatus comprises:
a first closed circuit housing a first work fluid,
an evaporator comprised in the closed circuit, with an inlet and an outlet,
a circuit expander comprised in the closed circuit, with an inlet and an outlet,
a condenser comprised in the closed circuit, with an inlet and an outlet, and
a circuit compressor comprised in the closed circuit, with an inlet and an outlet,
wherein the first work fluid in the evaporator is in thermal contact with the hot side of the energy recovering module, the outlet of the evaporator being in fluid connection with the inlet of the circuit expander, and the outlet of the expander being in fluid contact with the inlet of the circuit condenser, and
wherein the first work fluid in the circuit condenser is in thermal contact with the cold side of the energy recovering module, the outlet of the circuit condenser being in fluid connection with the inlet of the circuit compressor, and the outlet of the circuit compressor being in fluid contact with the inlet of the circuit evaporator,
therefore some work being obtained by the first work fluid when passing through the expander.

In a particular embodiment, the conversion apparatus further comprises an intermediate exchange zone where part of the first closed circuit comprised between the outlet of the circuit expander and the inlet of the condenser is in thermal contact with part of the first closed circuit comprised between the outlet of the circuit compressor and the inlet of the evaporator.

In a particular embodiment, the conversion apparatus comprises:

at least four piston assemblies, each one having a cold side and a hot side, at least four regenerators, each one having a cold side and a hot side, wherein the piston assemblies and the regenerators are arranged in a second closed circuit containing a second work fluid that runs inside the piston assemblies and inside the regenerators, such that each regenerator is in fluid connection with two piston assemblies, the preceding one and the subsequent one, and each piston assembly is in fluid connection with two regenerators, the preceding one and the subsequent one, wherein between each piston assembly and the subsequent regenerator there is a zone of the second closed circuit that allows heat exchange between the second work fluid and the hot side of the energy recovering module, and wherein between each regenerator and the subsequent piston assembly there is a zone of the second closed circuit that allow heat exchange between the second work fluid and the cold side of the energy recovering module, therefore some work being obtained by the second work fluid when passing through the piston assemblies.

In a particular embodiment, work is transformed into electrical energy by an electrical generator.

In a particular embodiment, the secondary heat exchanger also comprises a bypass valve placed in a secondary channel, which is suitable for bypassing the compressor and turbine by creating a fluid contact between the inlet of the compressor and the outlet of the turbine.

In particular embodiments, the conversion apparatus is arranged in a compact module to minimize its size.

BRIEF DESCRIPTION OF THE DRAWINGS

These and other characteristics and advantages of the invention will become clearly understood in view of the detailed description of the invention which becomes apparent from preferred embodiments of the invention, given just as an example and not being limited thereto, with reference to the drawings.

DETAILED DESCRIPTION OF THE PREFERRED EMBODIMENTS

Once an object of the invention has been outlined, specific non-limitative embodiments are described hereinafter.

Figure 1:
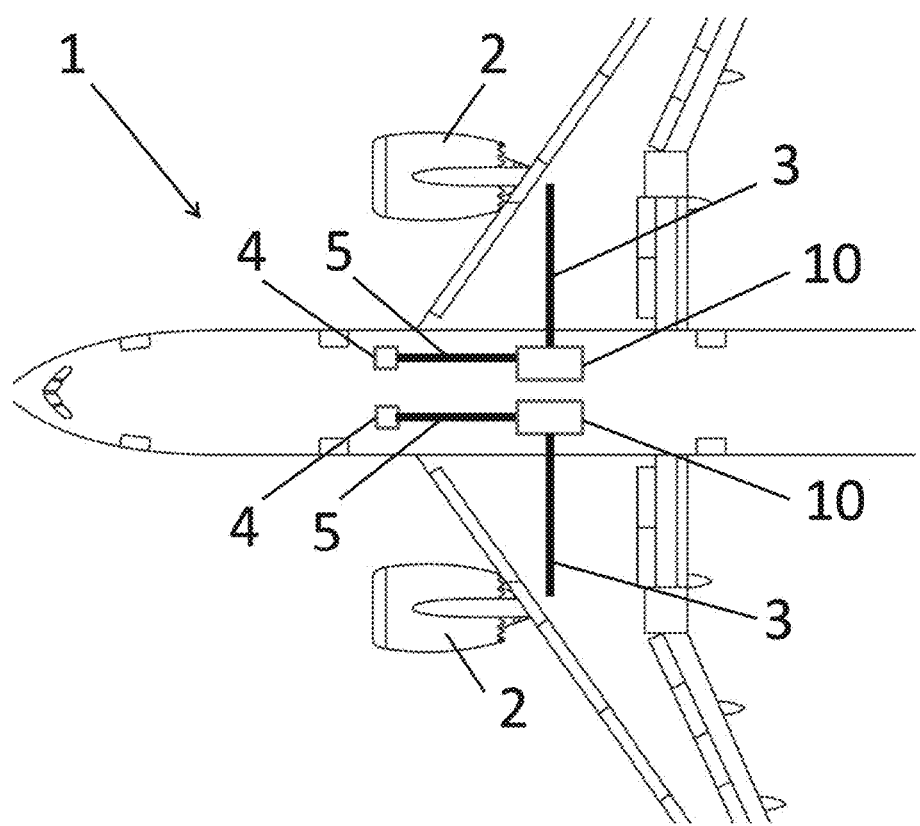
FIG. 1 shows an aircraft according to the invention.

FIG. 1 shows an aircraft according to the invention. This aircraft (1) comprises an engine (2) with a bleed air port suitable for letting air from the engine flowing into a bleed air duct (3), a ram air inlet flap (4), suitable for letting air from the outside of the aircraft flowing into a ram air duct (5), and a heat exchanging pack (10), which receives the bleed air duct (3) and the ram air duct (5).

Figure 2:
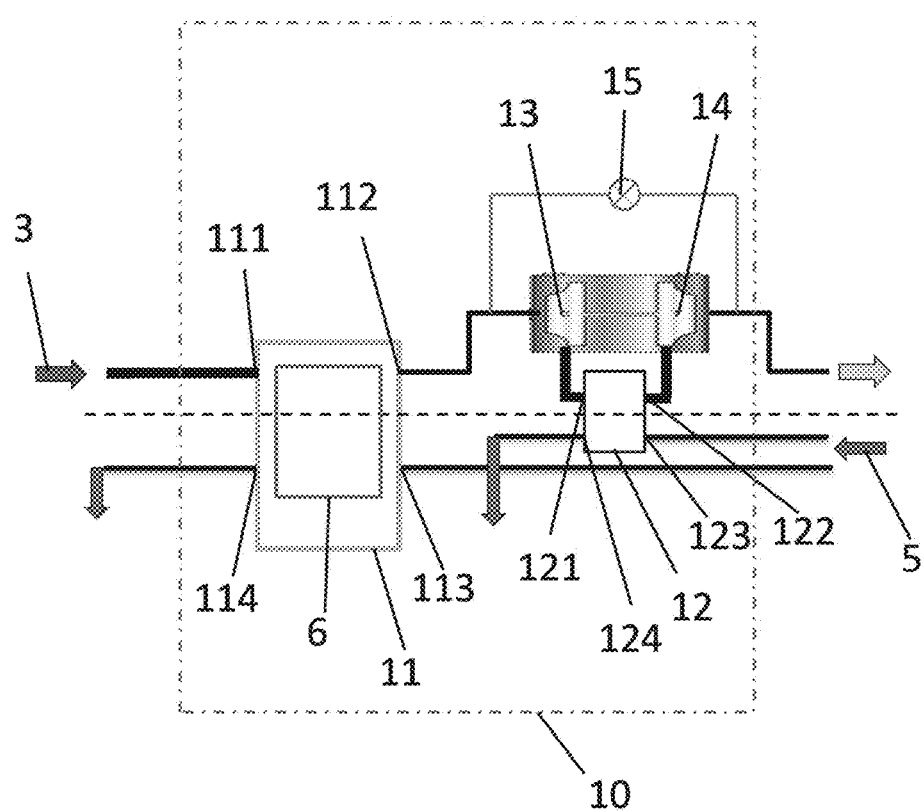
FIG. 2 shows a schematic view of a heat exchanging pack comprised in an aircraft according to the invention.

FIG. 2 shows a detail of a heat exchanging pack (10) comprised in the aircraft of the invention. This heat exchanging pack (10) comprises an energy recovering module (11) and a secondary heat exchanger (12).

The energy recovering module (11) has a hot side comprising a hot side inlet (111) and a hot side outlet (112), and a cold side, comprising a cold side inlet (113) and a cold side outlet (114). The hot side is in thermal contact with the cold side via an conversion apparatus (6), thus causing a heat exchange.

The secondary heat exchanger (12) has a hot side inlet (121), a hot side outlet (122), a cold side inlet (123) and a cold side outlet (124).

The heat exchanging pack further comprises a compressor (13) coupled with a turbine (14), the compressor (13) and turbine (14) having an inlet and an outlet.

All these elements are arranged in the following way:

the hot side inlet (111) of the energy recovering module (11) is in fluid communication with the bleed air duct (3), the cold side inlet (113) of the energy recovering module (11) is in fluid communication with the ram air duct (5), the hot side outlet (112) of the energy recovering module (11) is in fluid communication with the compressor inlet, the compressor outlet is in fluid communication with the hot side inlet (121) of the secondary heat exchanger (12), the hot side outlet (122) of the secondary heat exchanger (12) is in fluid communication with the turbine inlet, the cold side inlet of the secondary heat exchanger (12) is in fluid communication with the ram air duct (5), wherein The conversion apparatus (6) is adapted to generate electrical energy out from the heat exchange that takes place in the energy recovering module (11) between the hot side and the cold side.

The compressor (13) compresses the hot flow received from the hot side outlet (112) of the energy recovering module (11) and expands the hot flow received from the hot side outlet (122) of the secondary heat exchanger (12). In this figure, the secondary heat exchanger (12) also comprises a bypass valve (15), which is suitable for bypassing the compressor-turbine system, whenever it is necessary.

The energy recovering module (11) comprises the conversion apparatus (6), adapted to generate energy out from the heat exchanging that takes place in the energy recovering module.

Figure 3:
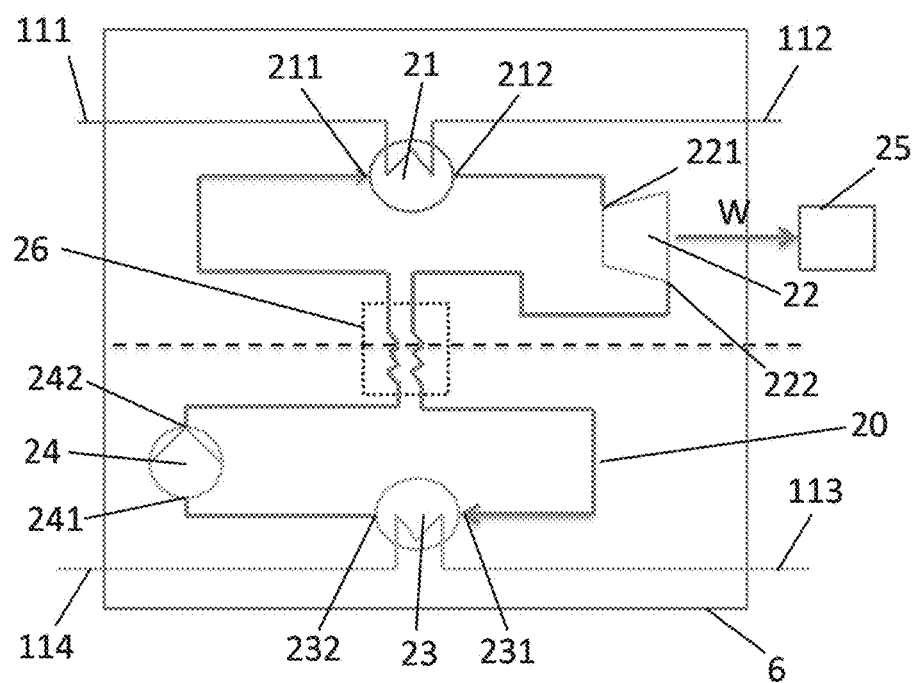
FIG. 3 shows a schematic view of the conversion apparatus comprised in a first embodiment of an aircraft according to the invention.

FIG. 3 shows a schematic view of the conversion apparatus (6) comprised in a particular embodiment of the aircraft according to the invention. This conversion apparatus (6) comprises a first closed circuit (20) housing a first work fluid, an evaporator (21) comprised in the closed circuit, with an inlet (211) and an outlet (212), a circuit expander (22) comprised in the closed circuit, with an inlet (221) and an outlet (222), a condenser (23) comprised in the closed circuit, with an inlet (231) and an outlet (232), and a circuit compressor (24) comprised in the closed circuit, with an inlet (241) and an outlet (242).

The first work fluid, when crossing the evaporator (21) is in thermal contact with the hot side of the energy recovering module (11). The outlet (212) of the evaporator (21) is in fluid connection with the inlet (221) of the circuit expander (22), and the outlet (222) of the expander (22) is in fluid contact with the inlet (231) of the circuit condenser (23). Further, the first work fluid, when crossing the circuit condenser (23) is in thermal contact with the cold side of the energy recovering module (11). The outlet (232) of the circuit condenser (23) is in fluid connection with the inlet (241) of the circuit compressor (24), and the outlet (242) of the circuit compressor (24) is in fluid contact with the inlet (211) of the circuit evaporator (21).

The first work fluid therefore runs inside the first closed circuit (20) from the evaporator (21) to the circuit expander (22), then to the condenser (23) and then to the circuit compressor (24) and back to the evaporator (21). Throughout this first closed circuit (20), the first work fluid undergoes a heat exchange with the hot side of the energy recovering module (11) in the evaporator (21) and another heat exchange with the cold side of the energy recovering module (11) in the condenser (23). Further, the first work fluid produces work (W) when passing through the expander (22). In this particular embodiment, this work (W) is transformed into electrical energy by an electrical generator (25).

In some particular embodiments, part of the first closed circuit comprised between the outlet (222) of the circuit expander (22) and the inlet (231) of the condenser (23) is in thermal contact with part of the first closed circuit comprised between the outlet (242) of the circuit compressor (24) and the inlet (211) of the evaporator (21). In the embodiment shown in the figure, this thermal contact between part of the first closed circuit comprised between the outlet (222) of the circuit expander (22) and the inlet (231) of the condenser (23) and part of the first closed circuit comprised between the outlet (242) of the circuit compressor (24) and the inlet (211) of the evaporator (21) is carried out in an intermediate exchange zone (26).

In the particular embodiment shown in this figure, this first work fluid is a refrigerant, which undergoes the thermodynamic cycle abovementioned.

Figure 4:
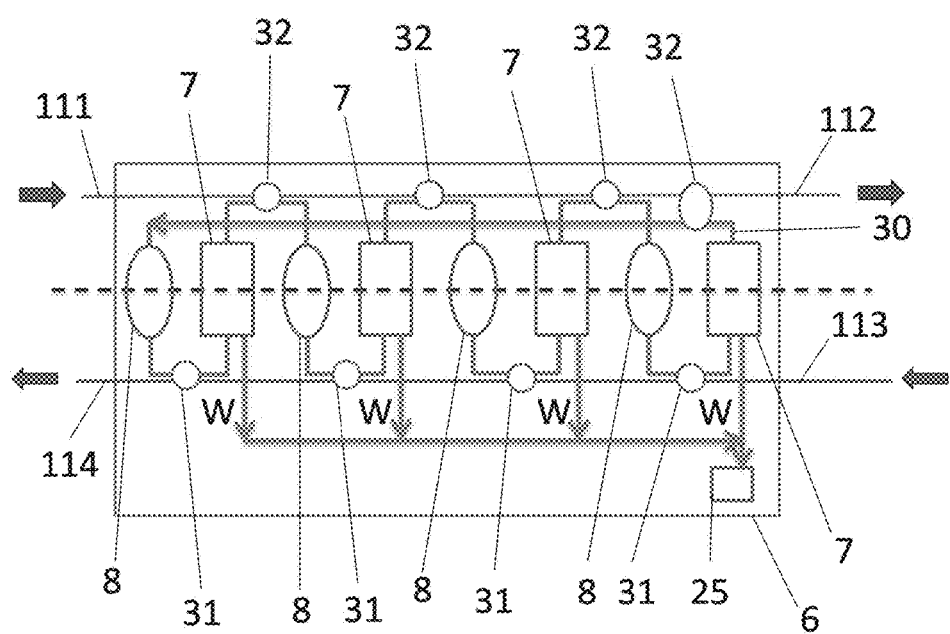
FIG. 4 shows a schematic view of the conversion apparatus comprised in a second embodiment of an aircraft according to the invention.

FIG. 4 shows a schematic view of the conversion apparatus (6) comprised in another particular embodiment of the aircraft according to the invention. This conversion apparatus (6) comprises at least four piston assemblies (7), each one having a cold side and a hot side, at least four regenerators (8), each one having a cold side and a hot side, wherein the piston assemblies (7) and the regenerators (8) are arranged in a second closed circuit (30) containing a second work fluid that runs inside the piston assemblies (7) and inside the regenerators (8), such that each regenerator (8) is in fluid connection with two piston assemblies, the preceding one and the subsequent one, and each piston assembly (7) is in fluid connection with two regenerators (8), the preceding one and the subsequent one, wherein between each piston assembly (7) and the subsequent regenerator (8) there is a zone (32) of the second closed circuit (30) that allows heat exchange between the second work fluid and the hot side of the energy recovering module (11), and wherein between each regenerator (8) and the subsequent piston assembly (7) there is a zone (31) of the second closed circuit (30) that allows heat exchange between the second work fluid and the cold side of the energy recovering module (11).

This second closed circuit (30) encloses a second working fluid, which undergoes the thermodynamic cycle through the piston assemblies (7) and regenerators (8), also exchanging heat in the heat exchanging zones, either with the hot flow or with the cold flow. In a particular embodiment, this second working fluid is a gas. In a more particular embodiment, this second working fluid is helium.

Energy is therefore obtained in the piston assemblies (7), in the form of electric energy (W) from some movable parts comprised in the assembly. In this particular embodiment, this work (W) is transformed into electrical energy by an electrical generator (25).

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft comprising:
   an engine with a bleed air port configured to let air from the engine flow into a bleed air duct,
   a ram air inlet flap, configured to let air from the outside of the aircraft flow into a ram air duct,
   a heat exchanging pack comprising:
      an energy recovering module with a hot side comprising a hot side inlet and a hot side outlet, and a cold side comprising a cold side inlet and a cold side outlet, the hot side being in thermal contact with the cold side via a conversion apparatus, thus causing a heat exchange,
      a secondary heat exchanger with a hot side inlet, a hot side outlet, a cold side inlet and a cold side outlet, and
      a compressor coupled with a turbine, the compressor and turbine having an inlet and an outlet,
   such that
      the hot side inlet of the energy recovering module is in fluid communication with the bleed air duct,
      the cold side inlet of the energy recovering module is in fluid communication with the ram air duct,
      the hot side outlet of the energy recovering module is in fluid communication with the compressor inlet,
      the compressor outlet is in fluid communication with the hot side inlet of the secondary heat exchanger,
      the hot side outlet of the secondary heat exchanger is in fluid communication with the turbine inlet,
      the cold side inlet of the secondary heat exchanger is in fluid communication with the ram air duct,
   wherein the conversion apparatus is configured to generate electrical energy out from the heat exchange that takes place in the energy recovering module between the hot side and the cold side, and wherein the conversion apparatus comprises:
      at least four piston assemblies, each one having a cold side and a hot side,
      at least four regenerators, each one having a cold side and a hot side,
      wherein the piston assemblies and the regenerators are arranged in a closed circuit containing a work fluid that runs inside the piston assemblies and inside the regenerators, such that each regenerator is in fluid connection with two piston assemblies, the preceding one and the subsequent one, and each piston assembly is in fluid connection with two regenerators, the preceding one and the subsequent one, wherein between each piston assembly and the subsequent regenerator there is a heat exchanger from a first plurality of heat exchangers, the heat exchangers from the first plurality of heat exchangers different from the at least four regenerators, and configured to exchange heat between the work fluid and the bleed air from the hot side of the energy recovering module, and wherein between each regenerator and the subsequent piston assembly there is also a heat exchanger from a second plurality of heat exchangers, the heat exchangers from the second plurality of heat exchangers different from the at least four regenerators and different from the heat exchangers from the first plurality of heat exchangers, and the heat exchangers from the second plurality of heat exchangers configured to exchange heat between the work fluid and the air from the ram air duct of the cold side of the energy recovering module.

2. The aircraft according to claim 1, wherein the conversion apparatus further comprises an electrical generator configured to transform work by the at least four piston assemblies into electrical energy.

3. The aircraft according to claim 1, wherein the secondary heat exchanger also comprises a bypass valve placed in a secondary channel, which secondary channel is suitable for bypassing the compressor and turbine by creating a fluid contact between the inlet of the compressor and the outlet of the turbine.

4. The aircraft according to claim 1, wherein the working fluid comprises a gas.

5. The aircraft according to claim 1, wherein the working fluid comprises helium.

\* \* \* \* \*